United States Patent
Pickel et al.

(10) Patent No.: US 9,652,361 B2
(45) Date of Patent: May 16, 2017

(54) TARGETED MULTI-TIERED SOFTWARE STACK SERVICEABILITY

(71) Applicant: International Business Machines Corporation, Armonk, NY (US)

(72) Inventors: James W. Pickel, Gilroy, CA (US); Pallavi Priyadarshini, Bangalore (IN); Mamta Sharma, Bangalore (IN); Parameswara R. Tatini, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 14/636,278

(22) Filed: Mar. 3, 2015

(65) Prior Publication Data

US 2016/0259707 A1  Sep. 8, 2016

(51) Int. Cl.
*G06F 11/00* (2006.01)
*G06F 11/36* (2006.01)
*G06F 11/07* (2006.01)
*G06F 11/22* (2006.01)

(52) U.S. Cl.
CPC ........ *G06F 11/3608* (2013.01); *G06F 11/362* (2013.01); *G06F 11/366* (2013.01); *G06F 11/3664* (2013.01); *G06F 11/079* (2013.01); *G06F 11/2257* (2013.01)

(58) Field of Classification Search
CPC . G06F 11/2257; G06F 11/079; G06F 11/3664
See application file for complete search history.

(56) References Cited

U.S. PATENT DOCUMENTS

| | | | |
|---|---|---|---|
| 5,864,662 | A | 1/1999 | Brownmiller et al. |
| 6,083,281 | A | 7/2000 | Diec et al. |
| 6,470,388 | B1 | 10/2002 | Niemi et al. |
| 7,165,190 | B1 | 1/2007 | Srivastava et al. |
| 7,266,758 | B2 | 9/2007 | Takeuchi et al. |

(Continued)

OTHER PUBLICATIONS

Pickel et al., "Targeted Multi-Tiered Software Stack Serviceability", U.S. Appl. No. 15/067,217, filed Mar. 11, 2016, 23 pages.

(Continued)

*Primary Examiner* — Charles Ehne
(74) *Attorney, Agent, or Firm* — James H. Mayfield

(57) ABSTRACT

As disclosed herein a method, executed by a computer, for enabling multi-tiered software stack diagnostic collection includes initiating, on a first tier of a multi-tiered software stack, a targeted diagnostics collection corresponding to a symptom of a failure, determining a symptom to a reason code mapping corresponding to the symptom in a product of a subsequent tier, and issuing a command to the product of the subsequent tier to initiate targeted diagnostics collection corresponding to the reason code. Problems or failures in a multi-tiered software stack environment may require analyses of programs or products corresponding to each tier of a multi-tiered software stack. The method described herein enables simultaneous collection of diagnostics for programs or products corresponding to each tier of a multi-tiered software stack. A computer system, and a computer program product corresponding to the method are also disclosed herein.

11 Claims, 4 Drawing Sheets

(56) References Cited

U.S. PATENT DOCUMENTS

| | | |
|---|---|---|
| 7,721,152 B1 | 5/2010 | Joshi et al. |
| 2004/0073843 A1* | 4/2004 | Dean .................. G06F 11/2257 714/37 |
| 2007/0283188 A1* | 12/2007 | Balzer ............... B60W 50/0205 714/26 |
| 2013/0173965 A1* | 7/2013 | Son .................... G06F 11/0748 714/37 |
| 2015/0254127 A1* | 9/2015 | Matthews ................. G06F 8/65 714/2 |
| 2016/0078342 A1* | 3/2016 | Tang ...................... H04L 41/00 706/47 |

OTHER PUBLICATIONS

IBM Appendix P, list of patents and patent applications treated as related, Mar. 11, 2016, 2 pages.
Fonseca et al., "X-Trace: A Pervasive Network Tracing Framework", Appears in the 4th USENIX Symposium on Networked Systems Design & Implementation (NSDI'07), Apr. 2007.

* cited by examiner

TARGETED MULTI-TIERED SOFTWARE STACK SERVICEABILITY

BACKGROUND OF THE INVENTION

The present invention relates generally to the field of software problem determination, and more particularly to online serviceability in a multi-tiered software stack.

A software stack, sometimes referred to as a solution stack, is a group of software subsystems that work in tandem to produce a result or achieve a common goal. The software stack can be thought of as a subsystem (e.g., programs and products) sitting on top of a computer operating system. The software stack and operating system comprise a platform where computer applications may run.

SUMMARY

As disclosed herein a method, executed by a computer, for enabling multi-tiered software stack diagnostic collection includes initiating, on a first tier of a multi-tiered software stack, a targeted diagnostics collection corresponding to a symptom of a failure, determining a symptom to a reason code mapping corresponding to the symptom in a product of a subsequent tier, and issuing a command to the product of the subsequent tier to initiate targeted diagnostics collection corresponding to the reason code. Problems or failures in a multi-tiered software stack environment may require analyses of programs or products corresponding to each tier of a multi-tiered software stack. The method described herein enables simultaneous collection of diagnostics for programs or products corresponding to each tier of a multi-tiered software stack. A computer system, and a computer program product corresponding to the method are also disclosed herein.

DETAILED DESCRIPTION

In today's high tech society, many day-to-day activities are highly dependent on applications running in a highly computerized network or environment. The computerized environment may require use of one or more program products to successfully execute an application, and the program products may be part of a multi-tiered software stack within the computerized environment. On occasion an application running in the computerized environment may fail (e.g., produces errors or end abnormally). Such circumstances may require a support team to run diagnostics in the computerized environment to determine the cause of the failure.

To gather diagnostic information, the scenario causing the failure is repeated in hopes the failure can be reproduced. Determining the root cause of the failure may require gathering diagnostic information from more than one product (tier) in the software stack and ultimately attempting to reproduce the failure multiple times until all necessary diagnostics have been obtained. It has been observed that enabling diagnostics individually on each product unnecessarily requires multiple attempts to reproduce a failure. The embodiments disclosed herein provide a method for targeted serviceability in a multi-tiered software stack.

Figure 1:
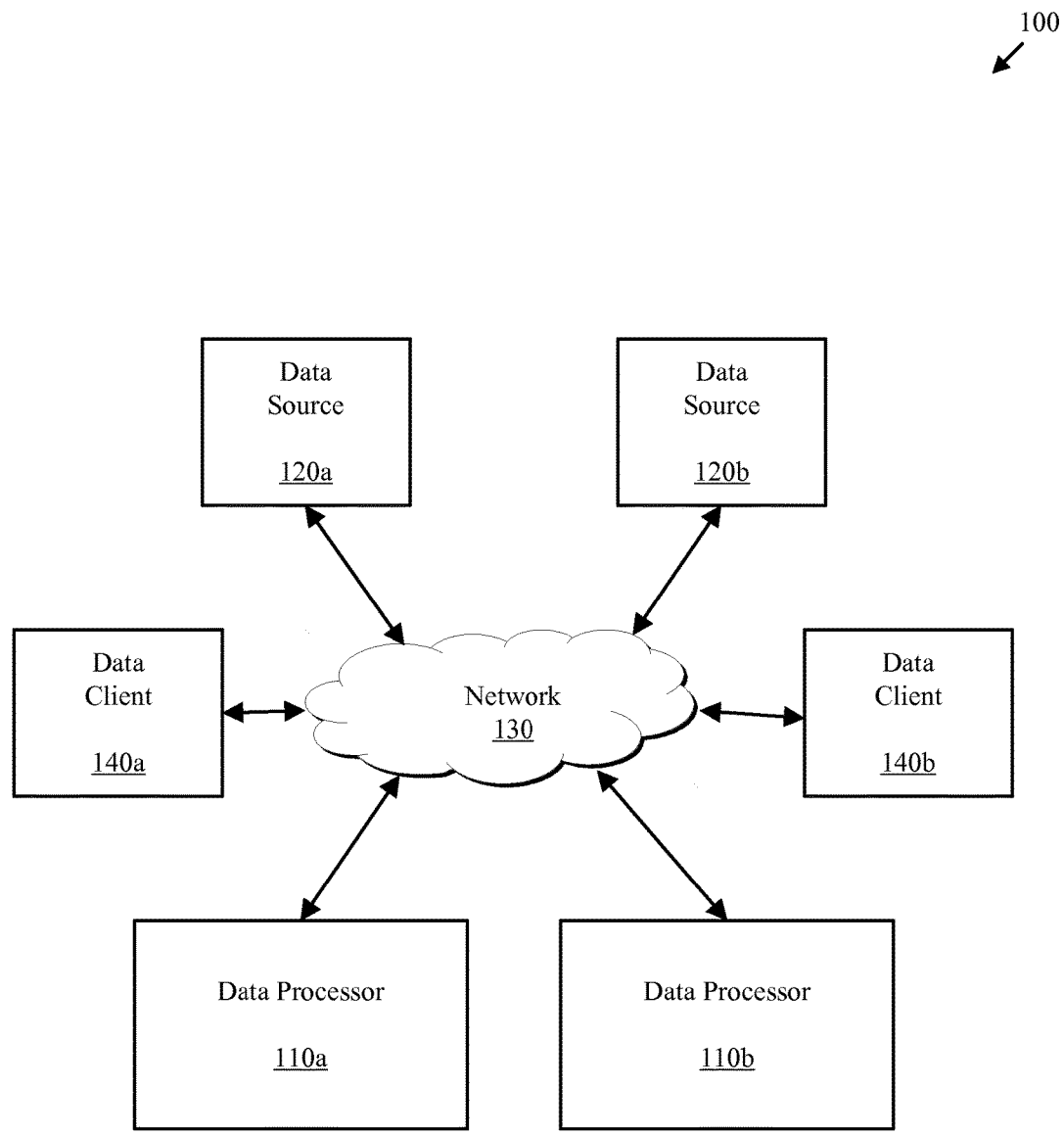
FIG. 1 is a functional block diagram of one embodiment of a distributed data processing environment in which at least some of the embodiments disclosed herein may be deployed.

FIG. 1 is a functional block diagram of one embodiment of distributed data processing environment 100. As depicted, distributed data processing environment 100 includes one or more data processors 110 (e.g., data processors 110a and 110b), one or more data sources 120 (e.g., data sources 120a and 120b), network 130, and one or more data clients 140 (e.g., data clients 140a and 140b). Distributed data processing environment 100 is one example of a computerized environment in which at least some of the embodiments disclosed herein may be deployed.

Data processor 110a may initiate and monitor a workflow that is utilizing a multi-tiered software stack within data processor 110a. The execution of an application included in the workflow may require processing by one or more products included in the multi-tiered software stack. In an embodiment, the workflow utilizing the multi-tiered software stack with data processor 110 may include operational steps depicted and described in FIG. 2. The products included in the multi-tiered software stack may be installed in the current computer (i.e., data processor 110a), or on another computer (e.g., data processor 110b, data sources 120, or data clients 140) accessible via network 130. The multi-tiered software stack may include access to database services provided by data clients 140 and data sources 120. A multi-tiered software stack is described in further detail with respect to FIG. 3.

When an application executed on data processor 110a requires database access, database access may be obtained via a tier from the multi-tiered software stack. Data sources 120 may be accessible to data processors 110 via network 130. One or more data clients 140 may also be connected to the data processors 110 via the network 130. In some embodiments, data processor 110a processes applications associated with a workflow being monitored by data processor 110b. In other embodiments, data clients 140 process jobs associated with the workflow being monitored by data processors 110. In another embodiment data sources 120 are also data clients 140.

Figure 4:
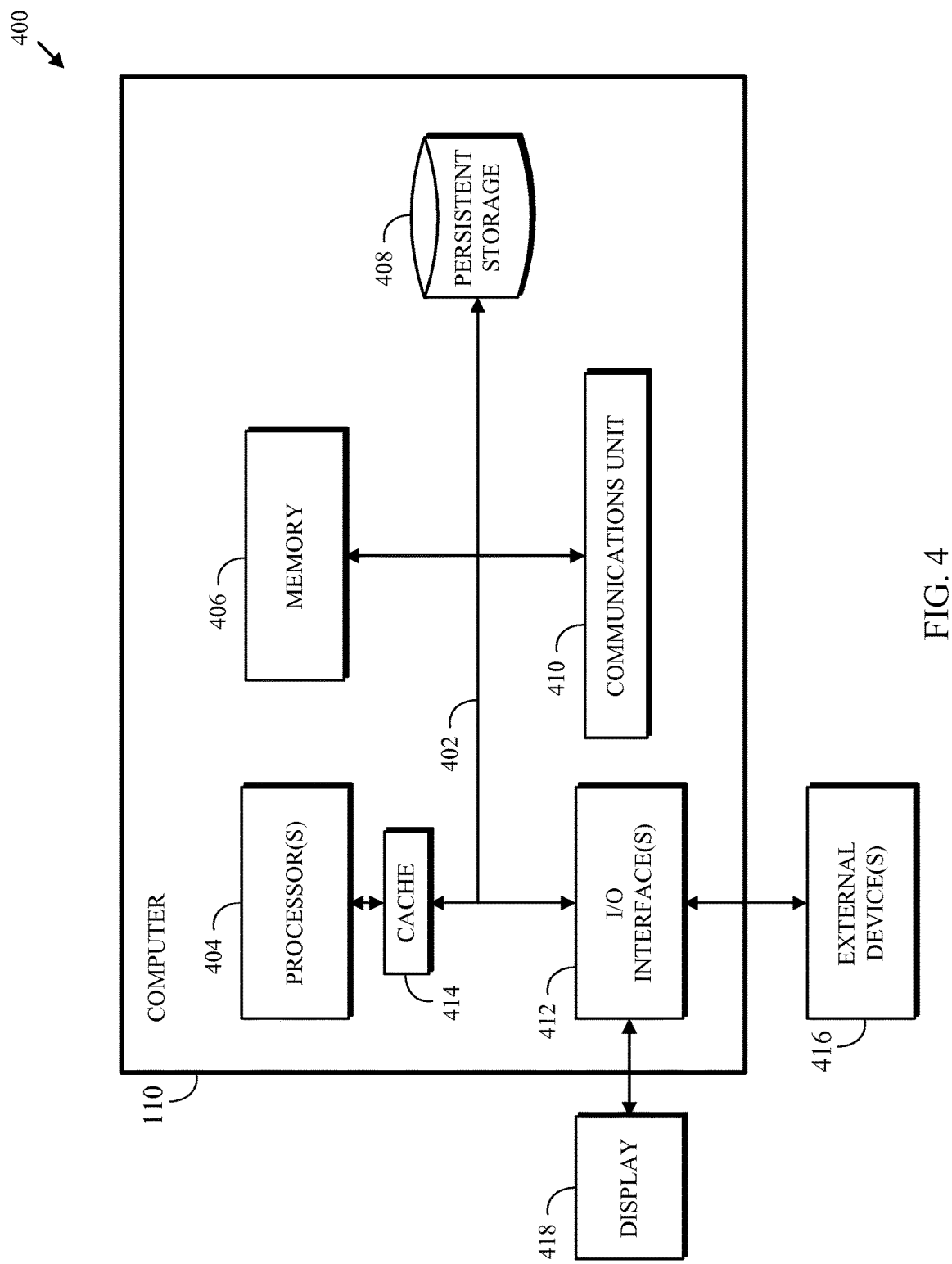
FIG. 4 is a block diagram depicting various components of one embodiment of a computer suitable for executing the methods disclosed herein, in accordance with an embodiment of the present invention.

It should be noted that data processors 110 may include internal and external hardware components, as depicted and described in further detail with respect to FIG. 4. Furthermore, network 130 can be any combination of connections and protocols that will support communications between data processors 110, data sources 120, and data clients 140 (i.e., data consumers). For example, network 130 can be a local area network (LAN), a wide area network (WAN) such as the Internet, or a combination of the two, and can include wired, wireless, or fiber optic connections.

Figure 2:
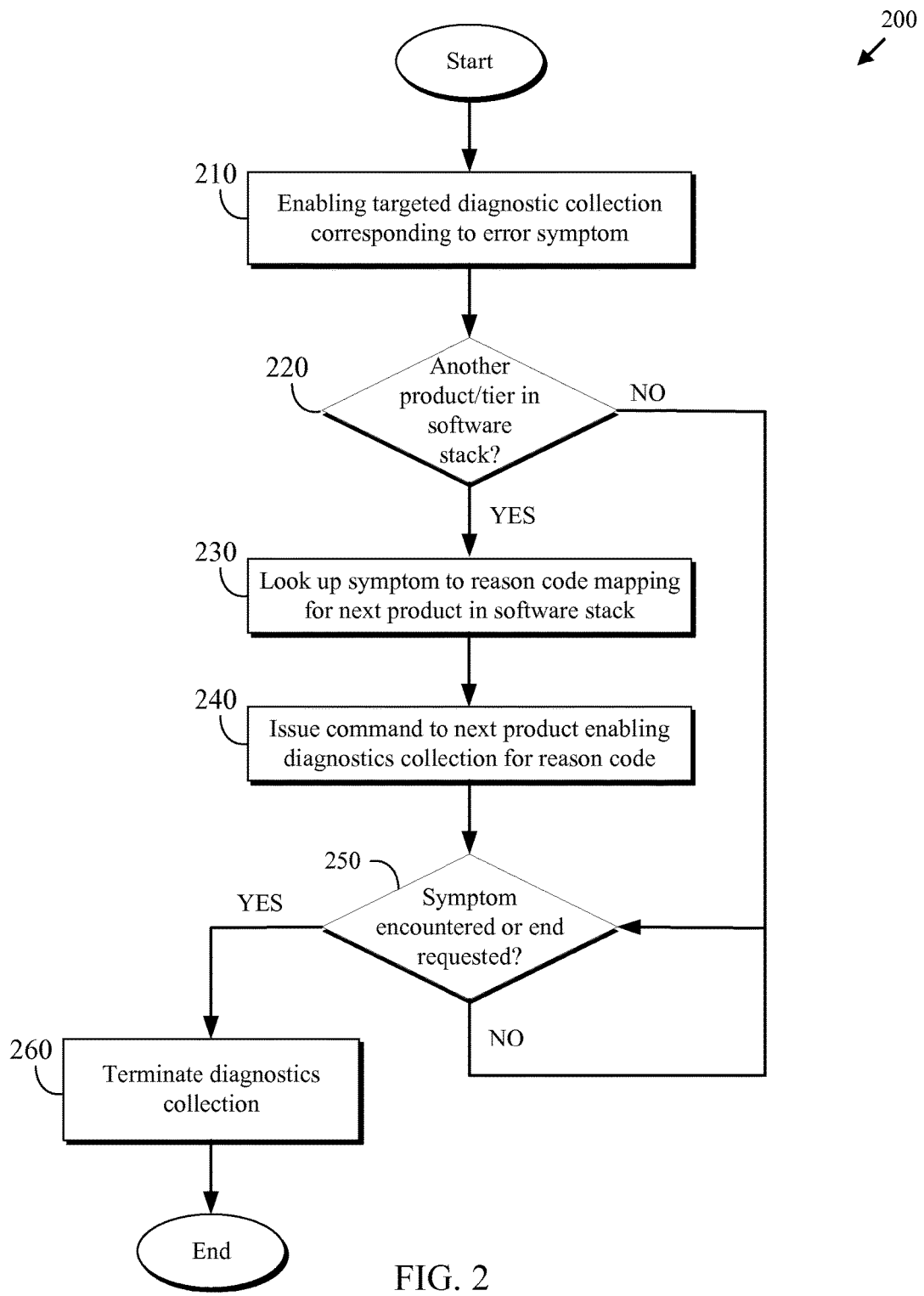
FIG. 2 is a flow chart depicting one embodiment of a diagnostic enabling method, in accordance with an embodiment of the present invention.

FIG. 2 is a flowchart depicting one embodiment of diagnostic enabling method 200. As depicted, diagnostic enabling method 200 includes enabling (210) targeted diagnostic collection, determining (220) whether there is another tier in the software stack, looking up (230) a symptom to reason code mapping, issuing (240) a diagnostic enabling command to the next tier (i.e., product), determining (250) whether termination of diagnostics collection has been requested, and terminating (260) diagnostics collection. Diagnostic enabling method 200 enables mapping of failure symptoms to reason codes and enabling diagnostic collection in a subsequent tier of a multi-tiered software stack.

Enabling (210) targeted diagnostic collection may include receiving a request (e.g., a command or signal) to begin collecting diagnostic information relating to a specific error symptom or reason code corresponding to an application failure. In some embodiments, a system administrator issues the command to enable targeted diagnostic collection. In other embodiments, the tier (i.e., product) receives the command to enable targeted diagnostic collection from an upper tier of the multi-tiered software stack. In another embodiment, the failure does not directly map to a specific reason code, and the tier (i.e., product) enables more general (i.e., default) diagnostics collection.

Determining (220) whether there is another tier in the software stack may include examination of the existing software stack to determine if the software stack is multi-tiered. If the software stack is multi-tiered, and there is an additional tier subsequent to the current tier, then diagnostic enabling method 200 proceeds to look up a symptom to reason code mapping operation 230. Otherwise, the method proceeds to determine whether termination of diagnostics collection has been requested 250.

Looking up (230) a symptom to reason code mapping may include determining the product referenced in the subsequent tier of the multi-tiered software stack, and determining what reason code corresponding to the product may cause the failure encountered in the current tier. In some embodiments, the symptom to reason code mapping is available as an independent, searchable list provided at the time of product installation. In other embodiments, the symptom to reason code mapping is available through an interface provided by the target product. In another embodiment, a symptom to reason code mapping is not available, resulting in default diagnostics collection being necessary. In an embodiment of the present invention, a depicted embodiment, the symptoms and reason codes corresponding to individual tiers may be different, and therefore looking up (230) a symptom to reason code mapping may be implemented differently in each tier.

Issuing (240) a diagnostic enabling command to the next tier (i.e., product) may include using the reason code determined in look up symptom to reason code mapping operation 230. A command enabling the collection of diagnostics corresponding to the determined reason code may be generated and transmitted to the product of the subsequent tier. In one embodiment, the subsequent tier receives a command enabling targeted diagnostic collection. Receiving the command triggers the beginning of a new instance of diagnostic enabling method 200 corresponding to the subsequent tier, as discussed above with reference to (210).

Determining (250) whether termination of diagnostics collection has been requested may include receiving a signal indicating the targeted diagnostic collection should be automatically terminated. In one embodiment, the failure is successfully reproduced, and an automatic request for termination of the targeted diagnostic collection is generated. In another embodiment, an adjacent tier receives a signal requesting termination of the targeted diagnostic collection. In yet another embodiment, an administrator issues a command to terminate the targeted diagnostic collection. If termination of diagnostics collection has been requested, then diagnostic enabling method 200 proceeds to terminate diagnostics collection operation 260. Otherwise, the method loops to determining (250) whether termination has been requested.

Terminating (260) diagnostics collection may include issuing a command to stop the collection of targeted diagnostics in the current tier of the software stack. In some embodiments, the product of the current tier transmits a signal requesting termination of diagnostics collection to the product in the previous tier. Additionally, if diagnostics collection is active in the subsequent tier, then the product of the current tier sends a signal to the subsequent tier requesting termination of diagnostics collection.

Figure 3:
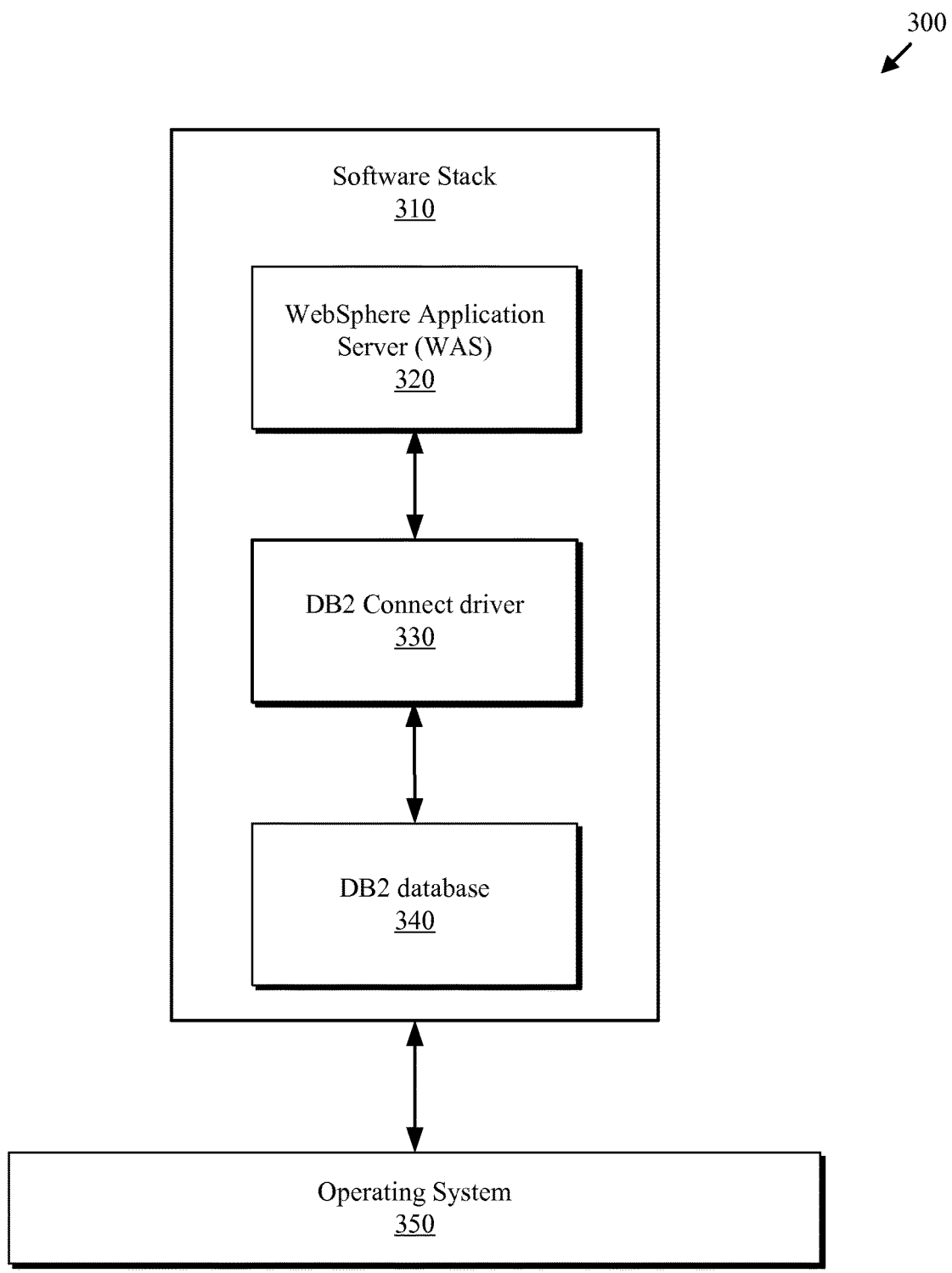
FIG. 3 is a block diagram depicting various components of one example of a multi-tiered software environment, in accordance with an embodiment of the present invention.

FIG. 3 is a block diagram depicting various components of one example of multi-tiered software environment 300. As depicted, multi-tiered software environment 300 includes software stack 310. Software stack 310 is a multi-tiered software stack and comprises application server tier 320 (e.g., a WebSphere Application Server), DB2 Connect driver tier 330, and DB2 database tier 340. Software stack 310 is dependent on operating system 350 which is an essential component in a computer system. Operating system 350 is software that manages the computer hardware and software resources as well as provide common services for computer applications. Multi-tiered software environment 300 is one example of a multi-tiered environment in which at least some of the embodiments disclosed herein may be deployed.

In the example, a computer application may be running in multi-tiered software environment 300. The application may encounter a stale connection failure and require problem diagnosis to determine the cause of the failure. In this example, the system administrator may activate diagnostics enabling method 200 discussed with reference to FIG. 2, to gather diagnostics for a stale connection failure in Websphere Application Server tier 320. Websphere Application Server tier 320 accesses the mapping of symptom to reason codes for DB2 Connect driver tier 330 and determines reason code −30108 from DB2 Connect driver tier 330 corresponds to a stale connection failure. Websphere Application Server tier 320 sends a command to DB2 Connect driver tier 330 to begin a targeted diagnostic collection for reason code −30108.

Based on operation of diagnostics enabling method 200 of FIG. 2, DB2 Connect driver tier 330 accesses the mapping of symptom to reason codes for DB2 database tier 340 and determines reason code −30108 is the result of an error in DB2 database tier 340, for example, an Agent Perm Reply error. DB2 Connect driver tier 330 sends a command to DB2 database tier 340 to begin a targeted diagnostic collection for an Agent Perm Reply error.

The application experiencing the failure may be executed again, using the same scenario that caused the stale connection failure. Each tier may be simultaneously performing diagnostics collection. Once the stale connection failure is encountered, the administrator may enter a command to terminate the diagnostic collection at Websphere Application Server tier 320. Websphere Application Server tier 320 may signal DB2 Connect driver tier 330 to terminate the diagnostic collection, and DB2 Connect driver tier 330 may signal DB2 database tier 340 to terminate the diagnostic collection. All collected diagnostic information may be stored in storage locations as defined by the individual products performing the diagnostic collection and may be available for problem determination.

It should be noted that the example of FIG. 3 is a single example of a multi-tiered software stack and is not intended to limit the invention. Those skilled in the art will understand that a multi-tiered software stack may be configured in numerous variations. The concepts presented in the example of FIG. 3 may be relevant to other multi-tiered software stack configurations.

FIG. 4 depicts a block diagram of components of a computer system 400, which is an example of a system such as data processors 110 (i.e., 110a or 110b) within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Data processors 110 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of data processors 110 (i.e., 110a or 110b). In these examples, communications unit 410 includes one or more network interface cards. Communications unit 410 may provide communications through the use of either or both physical and wireless communications links. Program instructions and data used to practice embodiments of diagnostic enabling method 200 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for enabling multi-tiered software stack diagnostic collection, the computer program product comprising:
   one or more computer readable storage media and program instructions stored on the one or more computer readable storage media, the program instructions comprising instructions to:
   initiate, on a first tier of a multi-tiered software stack, a targeted diagnostics collection corresponding to a symptom of a failure;
   determine a symptom to a reason code mapping corresponding to the symptom in a product of a subsequent tier, wherein the symptom to a reason code map is available for each tier of the multi-tiered software stack; and
   issue a command to the product of the subsequent tier to initiate targeted diagnostics collection corresponding to the reason code.

2. The computer program product of claim 1, wherein the targeted diagnostics collection is initiated by a system administrator on the first tier of the multi-tiered software stack.

3. The computer program product of claim 1, wherein a first tier of a multi-tiered software stack determines if the subsequent tier exists.

4. The computer program product of claim 1, wherein a request for termination of the targeted diagnostic collection is initiated by a system administrator.

5. The computer program product of claim 1, wherein a signal is received from a subsequent tier requesting termination of the targeted diagnostic collection.

6. The computer program product of claim 1, wherein the targeted diagnostics collection is automatically terminated when a target of the targeted diagnostics is encountered.

7. A computer system for enabling multi-tiered software stack diagnostic collection, the computer system comprising:
   one or more computer processors;
   one or more computer readable storage media;
   program instructions stored on the computer readable storage media for execution by at least one of the computer processors, the program instructions comprising instructions to:
   initiate, on a first tier of a multi-tiered software stack, a targeted diagnostics collection corresponding to a symptom of a failure;
   determine a symptom to a reason code mapping corresponding to the symptom in a product of a subsequent tier, wherein the symptom to a reason code map is available for each tier of the multi-tiered software stack; and issue a command to the product of the subsequent tier to initiate targeted diagnostics collection corresponding to the reason code.

8. The computer system of claim 7, wherein the targeted diagnostics collection is initiated by a system administrator on the first tier of the multi-tiered software stack.

9. The computer system of claim 7, wherein a first tier of a multi-tiered software stack determines if the subsequent tier exists.

10. The computer system of claim 7, wherein a request for termination of the targeted diagnostic collection is initiated by a system administrator.

11. The computer system of claim 7, wherein a signal is received from a subsequent tier requesting termination of the targeted diagnostic collection.

\* \* \* \* \*